United States Patent
Tsukamoto et al.

[11] Patent Number: 5,822,987
[45] Date of Patent: Oct. 20, 1998

[54] STATOR AND ONE WAY CLUTCH ASSEMBLY FOR A TORQUE CONVERTER

[75] Inventors: Kazumasa Tsukamoto; Masahiro Hayabuchi; Koji Maeda; Yutaka Teraoka, all of Anjo; Makoto Yamaguchi, Takefu, all of Japan

[73] Assignee: Aisin AW Co., Ltd., Japan

[21] Appl. No.: 816,773

[22] Filed: Mar. 18, 1997

[30] Foreign Application Priority Data

Mar. 28, 1996 [JP] Japan .................................... 8-099066

[51] Int. Cl.⁶ ......................................................... F16D 31/02
[52] U.S. Cl. ................................ 60/441; 60/341; 60/345; 192/3.21; 415/123
[58] Field of Search ............................ 60/441, 341, 345; 192/3.21, 110 B; 415/123; 416/197 C, 180

[56] References Cited

U.S. PATENT DOCUMENTS

| | | | |
|---|---|---|---|
| 5,125,487 | 6/1992 | Hodge | 192/3.34 |
| 5,586,434 | 12/1996 | Okubo et al. | 60/345 |
| 5,680,758 | 10/1997 | Miura | 60/345 |

*Primary Examiner*—Thomas E. Denion
*Assistant Examiner*—Bijan N. Karimi
*Attorney, Agent, or Firm*—Lorusso & Loud

[57] ABSTRACT

In a torque converter, in order to reduce the cost, simplify the manufacturing process and ensure the centering precision of the stator relative to the outer race of a one-way clutch, the stator and the outer race of the one-way clutch have first engaging surface portions preventing relative rotation therebetween and second engaging surface portions providing concentricity therebetween. The first and second surface portions are axially offset from each other.

17 Claims, 5 Drawing Sheets

STATOR AND ONE WAY CLUTCH ASSEMBLY FOR A TORQUE CONVERTER

BACKGROUND OF THE INVENTION

1. Field of the Invention

The present invention relates to a hydraulic power transmission, more specifically, to a support structure for a stator of a torque converter.

2. Description of the Prior Art

A torque converter has a stator which is arranged between a pump impeller and a turbine runner to amplify torque and which is supported by a reaction force element via a one-way clutch. Specifically, the stator is centered on the outer circumference of the outer race of the one-way clutch and fixed thereto against rotation. One proposed assembly method includes forcible insertion of a serration formed on the outer circumferential surface of an outer race made of steel into the inner circumferential surface of a stator made of aluminum with grooving by the serration. Another proposed assembly method involves casting of an outer race made of resin within the inner circumference of the stator. However, grooving by the serration has a drawback in that metal chips are produced which circulate in the torque converter in operation and thereby accelerate abrasion of various components. On the other hand, casting of a resin material has a drawback in that the outer race must be thicker to provide the necessary strength, which requires an increase in the size of the associated parts.

Conventionally, as disclosed in Japanese Patent Application Laid-Open Hei No. 5-99297, the stator has been centered with respect to the outer race, with prevention of relative rotation therebetween, by provision of splined and mating circumferential surfaces. According to this prior art, as illustrated in FIGS. 4 and 5, a plurality of splines b are formed at intervals around the inner circumferential surface of a stator hub a. Spline grooves d, which are engaged by the spline teeth b to form splined joint F, are formed on the outer circumferential surface of an outer race c.

Since the stator, in particular, must be centered with a high degree of precision, it is necessary to precisely machine the entire inner circumferential surface of the stator and the outer circumferential surface of the outer race, which are in contact with each other. However, in above-described design, since a cylindrical contacting surface is obtained by grooving the inner circumference of the stator hub a in forming the spline teeth b with gradual expansion of diameter, a costly process using a broach cutter of considerable axial length or the like is required. Moreover, machine finishing of the spline grooves d formed on the outer circumferential surface of the outer race is also required. All such finishing steps substantially increase the production cost.

SUMMARY OF THE INVENTION

Accordingly, a first object of the present invention is to provide a torque converter which may be manufactured by a simplified process for forming contacting surfaces of the stator and outer race of the one-way clutch, while providing good centering precision at a reduced cost.

A second object of the present invention is to improve the centering precision of the stator by simplifying the shape of the surfaces of the stator and the outer race which are in mating contact.

A third object of the present invention is to further reduce the cost by decreasing the man hours required for the total manufacturing process by eliminating the machining of the structure which serves to engage together the stator and the outer race of the one-way clutch.

In the above-described conventional design (FIG. 4), a front washer f, which serves to center the inner race e with respect to the outer race c of the one-way clutch, is extended radially outward to cover one end of the outer race and is fixed axially by a snap ring g, which is fitted to the stator hub a. In this design, since the fastening position of the snap ring g must be located further to the front to accommodate the thickness of the radially extended portion of the front washer f, the axial length of the stator hub a is increased correspondingly. Therefore, a fourth object of the present invention is to reduce the overall axial dimension by providing two radially overlapping separate portions for the axial positioning of the front washer and the stator hub, respectively, the two structures being radially aligned, i.e. one of the positioning structures being located radially inward of the other.

In the above-described conventional design, a rear washer h and the front washer f are arranged symmetrically on axially opposing sides of the outer race c. Since another snap ring for fastening is required in this design, for the same reason mentioned above, it is difficult to reduce the overall axial length. Accordingly, a fifth object of the present invention is to reduce the overall axial dimension by eliminating the snap ring conventionally used for holding the rear washer against the stator.

Within the torque converter, especially at the time of stalling, a front-to-rear thrust load is imposed on the stator of the torque converter, which thrust load is transmitted to the outer race c and the rear washer h via the snap ring g, and finally borne by a bearing i. However, the conventional design wherein the bearing i is arranged radially inward of the outer race c is disadvantageous in terms of strength, because a bending force is applied to the rear washer h interposed between the outer race c and the bearing i. Accordingly, a sixth object of the present invention is to alleviate that thrust load and ensure the integrity of the rear washer by properly positioning the bearing.

Furthermore, since a bending load is applied to the rear washer h because of the thrust load applied to the stator a, a minimum axial length is required for the splined connection. However, the conventional design wherein a splined portion is arranged axially to the rear of the inner race e is disadvantageous in terms of strength, making it difficult to reduce the axial dimension of the inner race e. Accordingly, a seventh object of the present invention is to reduce the overall axial dimension by providing a splined surface on the rear washer.

Moreover, in the conventional design, because the stator is centered with respect to the inner race e via the rear washer h and the outer race c, it is difficult to ensure a high degree of centering precision. Accordingly, an eighth object of the present invention is to further improve the centering precision for the stator by reducing the number of the support elements/portions which serve to center the stator.

In order to achieve the above-mentioned first object, the present invention provides a torque converter including a stator and a one-way clutch arranged radially inward of the stator, wherein the stator and an outer race of the one-way clutch are held against rotation and concentrically with respect to each other, and wherein the structure joining the stator and the outer race is divided into a splined portion and a centering portion which are axially offset from each other. In a preferred embodiment they are also radially offset from each other.

In order to achieve the above-mentioned second object, according to another aspect of the present invention, the centering portion has a smooth continuous circumferential surface without any unevenness.

In order to achieve the above-mentioned third object, according to yet another aspect of the present invention, the splined portion comprises inner and outer splines, the radial surfaces of each inner tooth (inner spline) are unfinished and have a predetermined draft (taper), and the radial surfaces of each outer tooth (outer spline) each have an incline corresponding to the draft of the inner teeth.

In order to achieve the above-mentioned fourth object, according to still another aspect of the present invention, the one-way clutch is provided with a front washer for centering the outer race with respect to the inner race, the outer race is axially positioned by being fixed to the stator with a snap ring, and the outer race and the front washer are axially positioned with respect to each other by means of welding at a position radially overlapping the snap ring.

In order to achieve the above-mentioned fifth object, according to still another aspect of the present invention, the stator and a rear washer, for centering the outer race of the one-way clutch with respect to the inner race, are integrally formed.

In order to achieve the above-mentioned sixth object, according to still another aspect of the present invention, a bearing is disposed on the axially opposite side of the rear washer (integrally formed with the stator) relative to the outer race.

In order to achieve the above-mentioned seventh object, according to still another aspect of the present invention, a splined portion for preventing a race of the bearing from rotating relative to the rear washer is formed at a radially inner circumferential surface of the bearing axially opposite the sprag of the one-way clutch relative to the rear washer.

In order to achieve the above-mentioned eighth object, according to still another aspect of the present invention, the stator has a second centering portion engaging the inner race in addition to the aforementioned first centering portion which engages the outer race.

In the present invention, since there is no need to provide engaging means for preventing relative rotation between the stator and the outer race on the centering structure (mating circumferential surfaces), it is possible to finish the centering structure using simple process equipment, and to provide a sufficient degree of centering precision for the stator at reduced cost. Where the centering structure is a smooth continuous circumferential surface without any unevenness, the finishing process is greatly improved, as is the centering precision.

In the case where the radial surfaces of each tooth of the inner splined surface are unfinished and the radial surfaces of each tooth of the outer splined surface have a mating taper, the inner splined surface may be used as formed by die-cast molding of the stator and the outer splined surface may be formed by cold-forging. Thus, at least the inner splines of the splined joint, which are difficult to finish by machining, can be left unfinished, i.e. as removed from the mold. In this way, it is possible to reduce the manufacturing cost. Also, because of the two-dimensional contact between the stator and the outer race, it is possible to prevent the abrasion which occurs in one-dimensional contact between the outer race (usually made of steel) and the stator (made of aluminum).

Furthermore, in the case where the front washer is fixed to the outer race by welding, the snap ring can be located in a recess within the outer race, axially rearward of the front surface of the front washer to provide a more compact design as compared with the conventional wherein the front washer is radially extended to cover the axial end surface of the outer race and held there by means of the snap ring. Thus, the overall axial dimension of the apparatus can be reduced.

Furthermore, in the case where the stator and the rear washer are integrally formed, the elimination of the snap ring allows the overall axial dimension to be further reduced.

Moreover, in the case where the portion of the rear washer radially overlapping the outer race is supported by the bearing, since the bearing is able to receive directly the thrust force applied to the rear washer, the rear washer is sufficiently reinforced.

In the case where the splined portion of the bearing race is arranged on the axially rear side of the sprag, the bearing serves to support the rear washer, thereby allowing the axial thickness of the rear washer to be reduced and enabling a reduction in the overall axial dimension of the torque converter.

Furthermore, in the case where the stator is centered with respect to the inner race via only the rear washer integral therewith, and the outer race does not contribute to the centering of the stator, it is possible to improve the centering precision of the stator.

DESCRIPTION OF A PREFERRED EMBODIMENT

Figure 1:
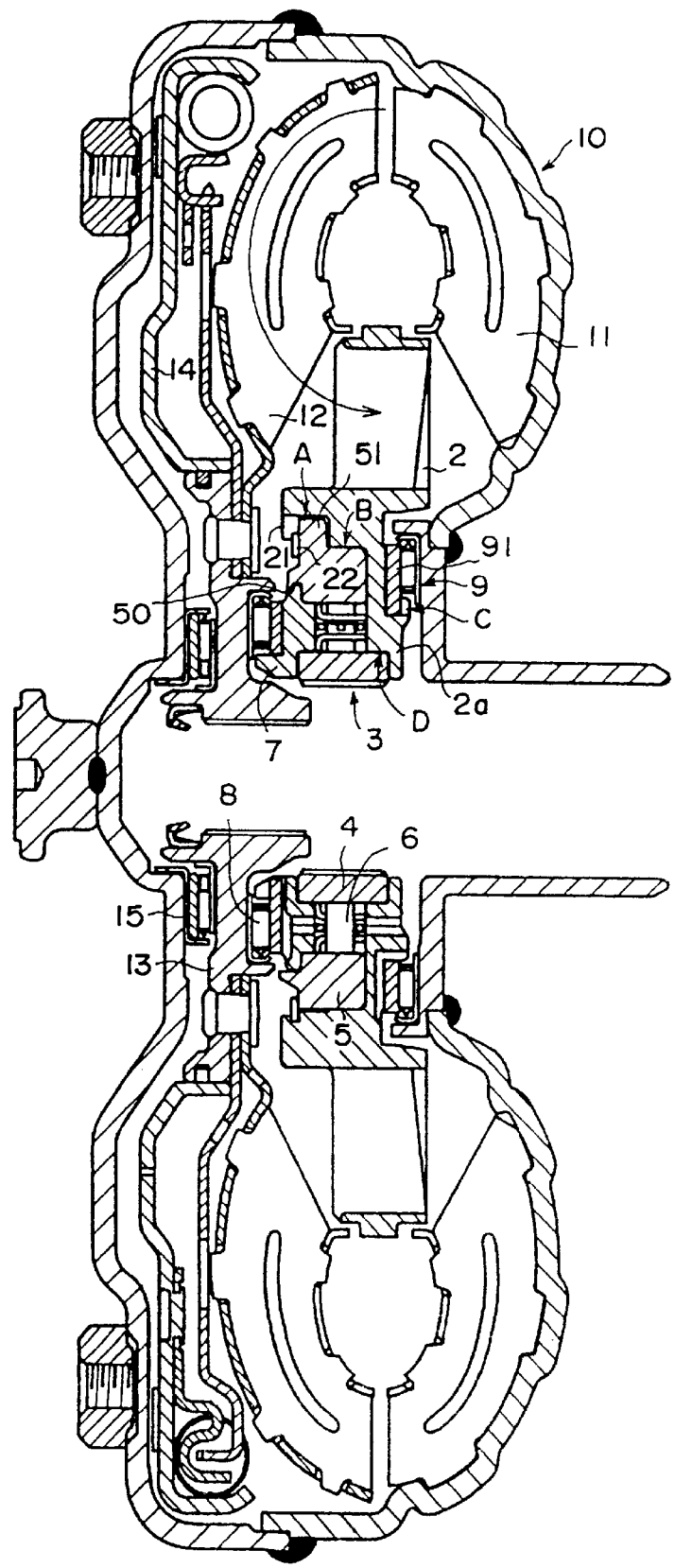
FIG. 1 is a cross-sectional view illustrating one embodiment of a torque converter according to the present invention.

An embodiment of the present invention will be described hereinafter with reference to the accompanying drawings. As shown in a cross-sectional view of FIG. 1, in this embodiment, a torque converter, which serves as a hydraulic power transmission unit, includes a pump impeller 11 fixed to a case 10, a turbine runner 12 arranged facing the pump impeller 11 and rotatably mounted in the case 10, a stator 2 arranged between the pump impeller 11 and the turbine runner 12, and a one-way clutch 3. The one-way clutch 3 is arranged radially inward of the stator 2 and includes an inner race 4, an outer race 5, and a sprag 6 interposed therebetween. The stator 2 and the outer race 5 of the one-way clutch 3 are fixed against rotation and are concentrically arranged relative to each other.

Figure 2:
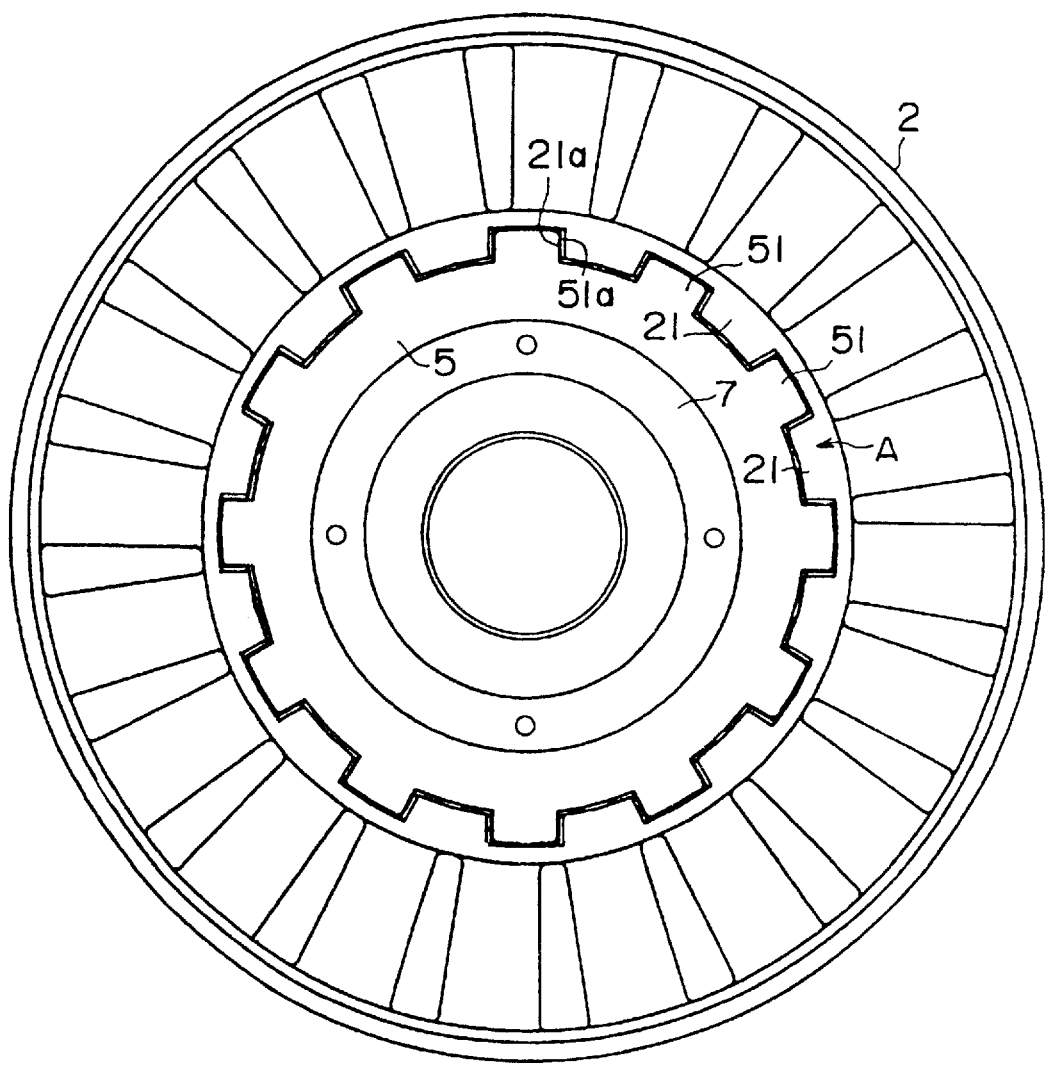
FIG. 2 is a front view illustrating the stator of the torque converter of FIG. 1.
Figure 3:
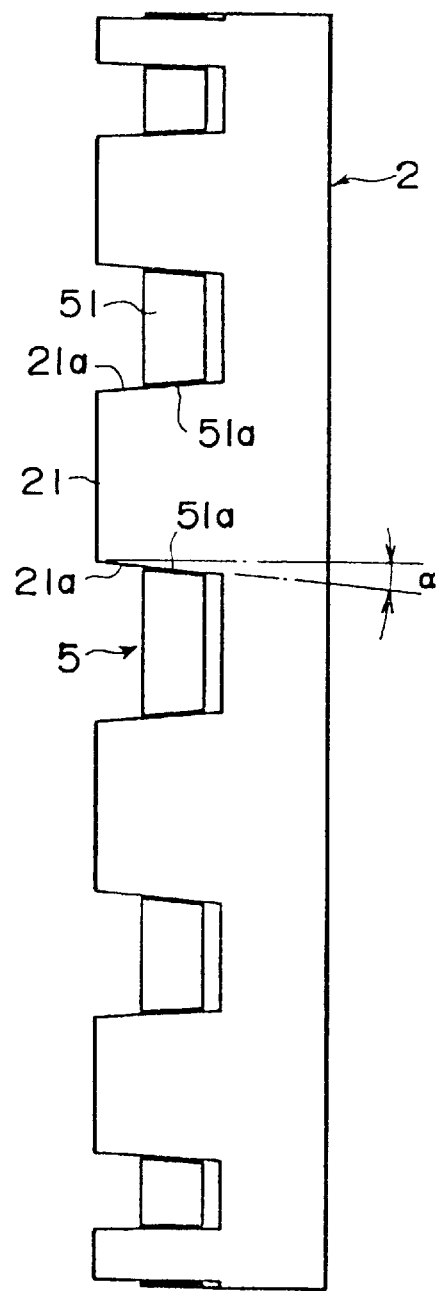
FIG. 3 is a side view illustrating engagement between the stator and the outer race of the torque converter of FIG. 1.
Figure 4:
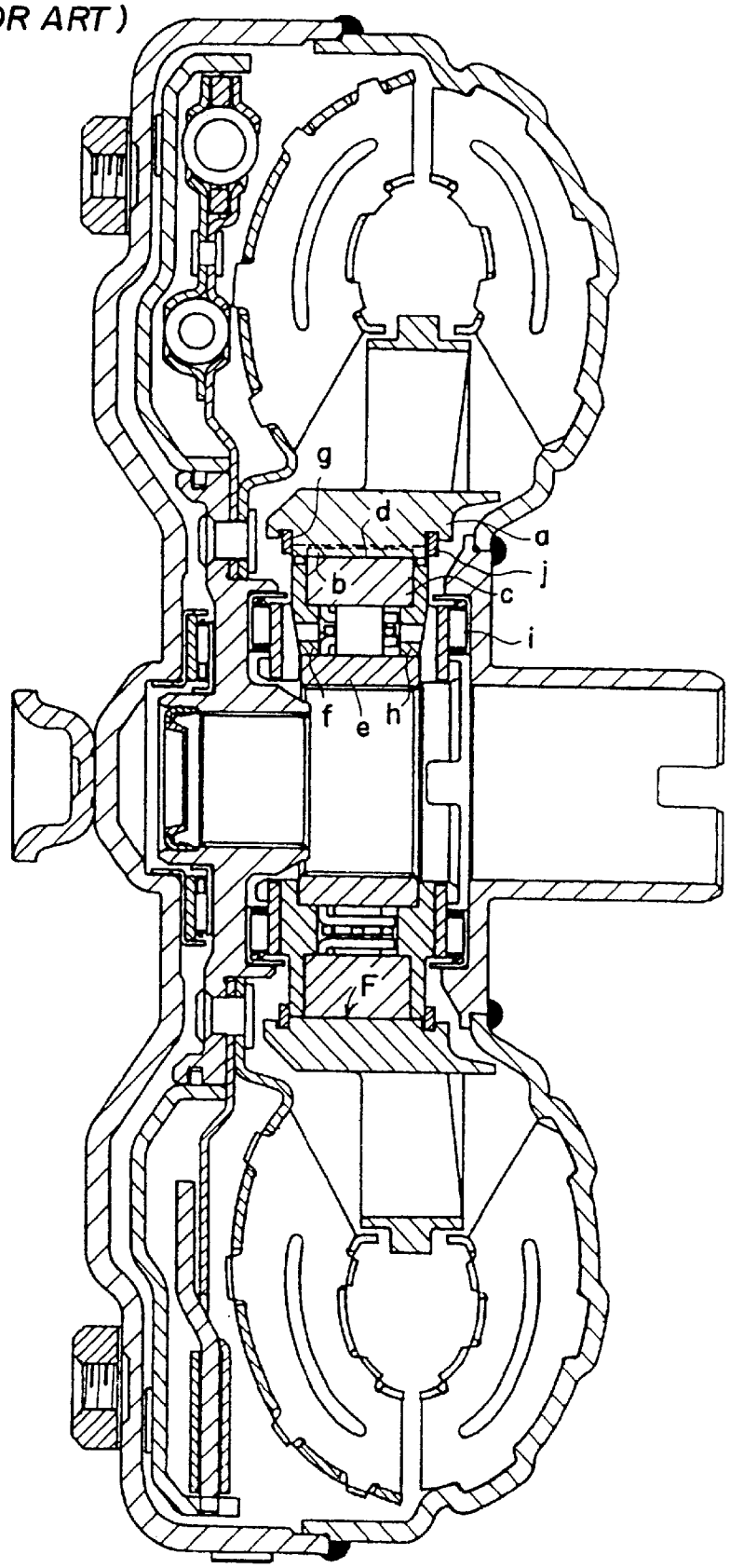
FIG. 4 is a cross-sectional view of a conventional torque converter.
Figure 5:
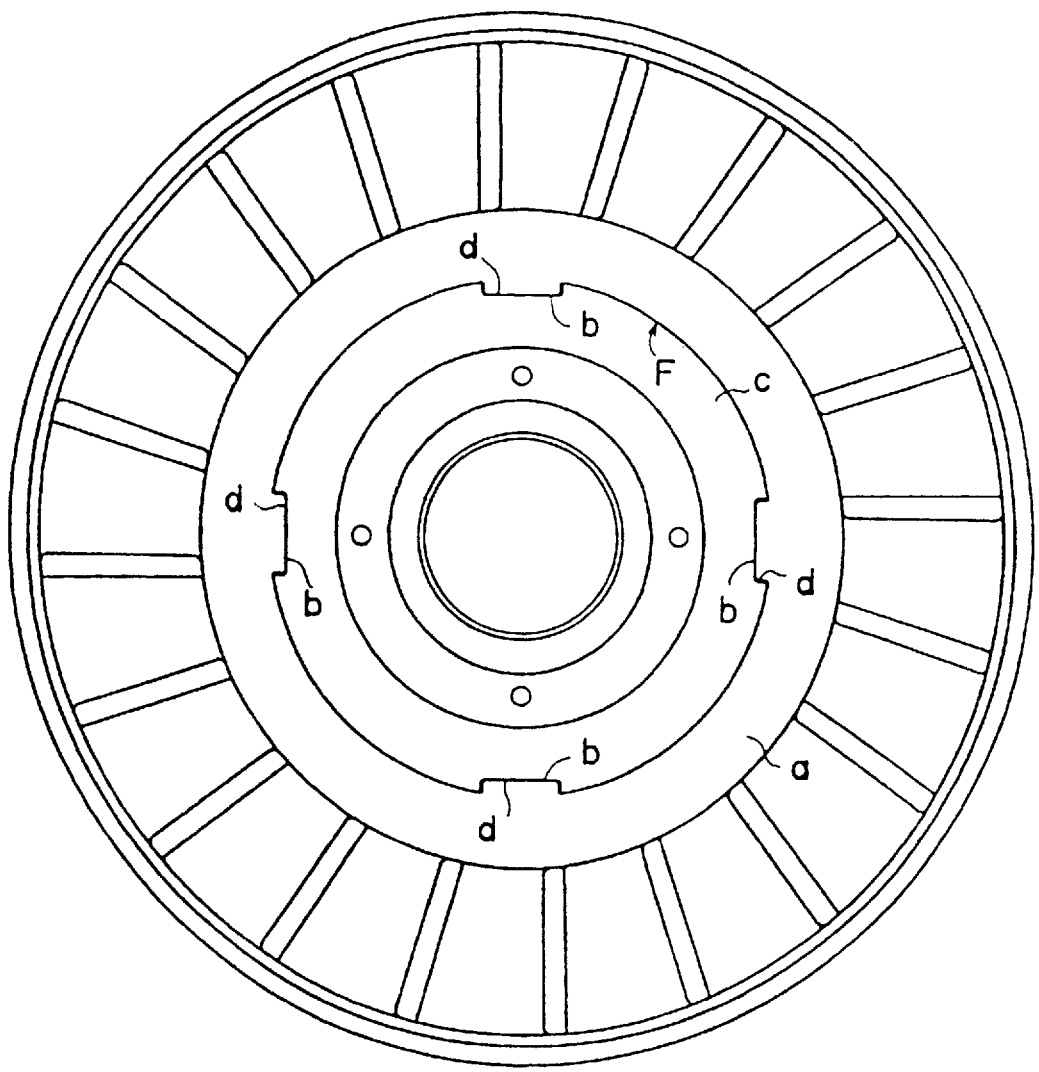
FIG. 5 is a plan view of the stator of the conventional torque converter of FIG. 4.

According to the present invention, the stator 2 and the outer race 5 are engaged through a splined portion A and a centering portion B, which are located axially and radially offset from each other. As shown in FIG. 2, the splined portion A includes an inner spline 21 and an outer spline 51. As shown in FIG. 3 in detail, the radial surface 21a of each tooth of the inner spline is an unfinished surface having a draft (taper) α, and the radial surface 51a of each tooth of the outer spline is a surface having an incline corresponding to the draft α. In other words, the splined portion A of the stator 2 and the outer race 5 is, in this embodiment, left unfinished, i.e. as molded. In forming the stator 2 of aluminum by die-casting, each sloped surface of the stator 2 is provided with a predetermined draft, i.e. the radial surfaces of each tooth of the inner spline 21a are each provided with a predetermined draft α. On the other hand, the outer race 5 is formed by cold-forging of a steel material. Therefore, in the cold-forging process the radial surface 51a of each tooth of the outer spline of the outer race 5 is provided with a predetermined slope α to achieve two-dimensional contact between the radial surfaces 51a and 21a.

On the other hand, the centering portion B includes inner and outer circumferential cylindrical surfaces formed on the stator 2 and the outer race 5, respectively. As in the conventional art, both the inner and outer circumferential surfaces are machined to provide a close fit.

The one-way clutch 3 is provided with a front washer 7 and a rear washer 2a so that the outer race 5 is centered with respect to the inner race 4, the axial positioning therebetween is fixed, and the axial positioning of the sprag 6 by means of a cage is also fixed. In this embodiment, the stator 2 has an elongated portion extending radially inward from the centering portion B, and this elongated portion functions as the rear washer 2a for positioning the one-way clutch 3. In other words, the stator 2 is formed integrally with the rear washer 2a of the one-way clutch 3. Accordingly, the stator 2 is centered with respect to the inner race 4 by engagement between an inner circumferential stepped surface of the rear washer 2a, integrally formed therewith, and the outer circumferential surface of the inner race 4.

The front washer 7, which is formed as a separate element as is conventional, is centered with respect to the inner race 4 by engagement of an inner circumferential stepped surface thereof with the outer circumferential surface and front edge of the inner race 4. The outer circumferential stepped surface of the front washer 7 is fitted to the inner circumferential surface of the outer race 5 and axially positioned and fixed with respect to the outer race 5 by staking at 50. The staking 50 is arranged at a position radially overlapping that of a snap ring 22. As a result, although the front side of the stator 2 is centered with respect to the inner race 4 via the outer race 5 and the front washer 7 as in the conventional art, the rear side thereof is centered with respect to the inner race 4 directly in one stage via the rear washer 2a integrally formed with the stator 2.

The stator 2, the outer race 5, the front washer 7 and the inner race 4, which are centered and axially positioned as described above, are supported by the case 10 via one pair of thrust bearings, i.e., a front thrust bearing 8 and a rear thrust bearing 9. The rear thrust bearing 9 is arranged axially opposite the outer race 5, on the other side of the rear washer 2a which is integrally formed with the stator 2. A spline C is formed on the inner periphery of the race 91 of bearing 9 for preventing relative rotation between the bearing race 91 and the rear washer 2a and is located radially inward of the bearing 9 and axially to the rear of the sprag 6.

The front thrust bearing 8 is arranged between the front washer 7 and the turbine runner 12. A hub 13, which also serves as the hub of a lock-up clutch 14, is supported by the case 10 via a thrust bearing 15.

As described above, since fluid flows in the direction of the arrow in FIG. 1, in the converter region when there is a great difference in rotation between the pump impeller 11 and the turbine runner 12 (especially when the turbine runner 12 is stalled because of an excessive vehicle load or the like), a front-to-rear thrust load is exerted on the stator 2 of the torque converter, transmitted through the stator 2 to the rear washer 2a, and finally received and absorbed by the bearing 9. In this embodiment, since the bending force applied to the rear washer 2a resulting from the thrust load is directly transferred to the bearing 9, the rear washer 2a is thereby protected against distortion.

Further, in the foregoing embodiment, since there is no need to provide the centering portion B with means for preventing relative rotation between the stator hub and the outer race 5 and because it is possible to provide a smooth machined finish on the mating cylindrical surfaces of the centering portion B using simple machining equipment, the cost required for machining is reduced and the precision of centering of the stator 2 is ensured. Also, since the radial surfaces of the teeth of the inner and outer splines 21, 51 are provided with the same incline α, the inner and outer splines engage with two-dimensional contact therebetween. Accordingly, for the purpose of reducing the cost, other surfaces of the splined connection A between the stator 2 and the outer race 5 can be left unfinished, that is, as molded. Furthermore, because of the two dimensional-contact between the radial contact surfaces of the respective teeth, it is possible to prevent the type of abrasion which would result from one-dimensional contact between the outer race 5 made of steel and the stator 2 made of aluminum.

Moreover, the configuration wherein the front washer 7 is fastened to the outer race 5 by staking allows the position of the snap ring 22 to be shifted further rearward. Therefore, it is possible to reduce the overall dimension of the apparatus as compared with the conventional configuration wherein the front washer f is extended to cover the end of the outer race c and is axially positioned, abutting stator a, by the snap ring g. Furthermore, the rear washer 2a integrally formed with the stator 2 and the resultant elimination of the snap ring j allow the axial dimension to be reduced. Besides, since the bending force applied to the rear washer 2a resulting from the thrust load is directly received by the bearing 9, the strength of the rear washer 2a is sufficiently ensured. In the case where the rear washer 2a is located axially to the rear of the sprag 6, the rear washer 2a is used to restrict the axial movement of the sprag 6. Accordingly, the overall axial dimension can be reduced correspondingly. Furthermore, since the stator 2 is centered with respect to the inner race, with a portion abutting same, without the outer race or a separate rear washer h interposed therebetween, the centering precision of the stator is further enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A torque converter comprising:
   a stator;
   a one-way clutch arranged radially inward of said stator and having inner and outer races, said outer race having first and second outer cylindrical surfaces engaging respectively first and second inner cylindrical surfaces on said stator, said first outer cylindrical surface having outer splines and said first inner cylindrical surface having inner splines meshed with said outer splines, said second surfaces engaging to center said stator on said one-way clutch, said first surfaces being axially offset from said second surfaces.

2. The torque converter of claim 1 wherein said first surfaces are radially offset from said second surfaces.

3. The torque converter of claim 1 wherein said second cylindrical surfaces are continuous circumferential smooth surfaces with no unevenness.

4. The torque converter of claim 2 wherein said second cylindrical surfaces are continuous circumferential smooth surfaces with no unevenness.

5. The torque converter of claim 1, wherein said inner splines each have opposing radial tapered surfaces which are unfinished, and said outer splines have radial surfaces with a taper corresponding to the taper of said inner splines and providing two-dimensional contact between mating radial surfaces of said inner and outer splines.

6. The torque converter of claim 3, wherein said inner splines each have opposing radial tapered surf aces which are unfinished, and said outer splines have radial surfaces with a taper corresponding to the taper of said inner splines and providing two-dimensional contact between mating radial surfaces of said inner and outer splines.

7. The torque converter of claim 1 further comprising:

a front washer for holding said outer race in radial alignment with said inner race, a snap ring for holding said outer race in a position axially abutting said stator, and a weld fixing said outer race to said front washer, said weld being located at a position radially aligned with said snap ring.

8. The torque converter of claim 3 further comprising:

a front washer for holding said outer race in radial alignment with said inner race, a snap ring for holding said outer race in a position axially abutting said stator, and a weld fixing said outer race to said front washer, said weld being located at a position radially aligned with said snap ring.

9. The torque converter of claim 5 further comprising:

a front washer for holding said outer race in radial alignment with said inner race, a snap ring for holding said outer race in a position axially abutting said stator, and a weld fixing said outer race to said front washer, said weld being located at a position radially aligned with said snap ring.

10. The torque converter of claim 1, wherein said stator has an integral, radially extended portion axially abutting said inner and outer races of said one-way clutch for holding said inner and outer races in radial alignment.

11. The torque converter of claim 3, wherein said stator has an integral, radially extended portion axially abutting said inner and outer races of said one-way clutch for holding said inner and outer races in radial alignment.

12. The torque converter of claim 5, wherein said stator has an integral, radially extended portion axially abutting said inner and outer races of said one-way clutch for holding said inner and outer races in radial alignment.

13. The torque converter of claim 7, wherein said stator has an integral, radially extended portion axially abutting said inner and outer races of said one-way clutch for holding said inner and outer races in radial alignment.

14. The torque converter of claim 10 further comprising a bearing disposed axially opposite said outer race relative to said radially extended portion of said stator.

15. The torque converter of claim 14, wherein said one-way clutch further has a sprag between said inner and outer races and wherein a race of said bearing is engaged with said rear washer at a splined connection formed radially inward of said bearing and axially opposite said sprag of said one-way clutch relative to said radially extended portion of said stator.

16. The torque converter of claim 1, wherein said stator additionally has a third inner cylindrical surface engaged with said inner race, and is thus centered by engagement with said inner and outer races.

17. The torque converter of claim 10 wherein said stator additionally has a third inner cylindrical surface, formed on a distal end of said radially extended portion, radially abutting said inner race.

* * * * *